United States Patent [19]

Shimamura et al.

[11] Patent Number: 4,724,310

[45] Date of Patent: Feb. 9, 1988

[54] DEVICE FOR INSERTING AND HOLDING AN IC CARD AS AN EXTERNAL MEMORY DURING READING AND WRITING OPERATIONS

[75] Inventors: Norio Shimamura; Taiji Sudo, both of Tokyo, Japan

[73] Assignee: Tokyo Tatsuno Co., Ltd., Tokyo, Japan

[21] Appl. No.: 747,148

[22] Filed: Jun. 20, 1985

[30] Foreign Application Priority Data

| Jul. 2, 1984 | [JP] | Japan | 59-137836 |
| Jul. 3, 1984 | [JP] | Japan | 59-136498 |
| Jul. 10, 1984 | [JP] | Japan | 59-144009 |
| Jul. 12, 1984 | [JP] | Japan | 59-143307 |
| Dec. 27, 1984 | [JP] | Japan | 59-281774 |
| Dec. 27, 1984 | [JP] | Japan | 59-281775 |

[51] Int. Cl.$^4$ .......................... G06K 7/04; G06K 13/08
[52] U.S. Cl. ..................................... 235/483; 235/441; 235/482; 235/486; 439/325
[58] Field of Search ............... 235/483, 482, 486, 441, 235/379, 380, 475, 492, 442, 443, 485; 339/75 MP, 176 MP, 34, 64 M

[56] References Cited

U.S. PATENT DOCUMENTS

| 3,705,396 | 12/1972 | Nagaki et al. | 235/485 |
| 3,866,827 | 2/1975 | Obata et al. | 235/482 |
| 4,114,028 | 9/1978 | Baio et al. | 235/482 |
| 4,449,775 | 5/1984 | DePommery et al. | 339/75 MP |
| 4,527,052 | 7/1985 | Kilborn | 235/475 |
| 4,575,703 | 3/1986 | Shishido | 235/482 |

Primary Examiner—Raymond F. Cardillo
Assistant Examiner—Robert A. Weinhardt
Attorney, Agent, or Firm—Jordan and Hamburg

[57] ABSTRACT

A reader/writer for an IC card as an external memory is constructed with a carriage longitudinally movable in a casing which is normally held in a waiting position. The carriage is held by a spring and moved to an operating position by manually inserting the IC card engaging therewith against the force of the spring. A block having contact pins is snugly embraced by the carriage and is adapted to vertically move relative to the carriage when the carriage is moving to the operating position by sliding up a sloped floor to establish an electrical connection with contact points on the IC card.

The IC card is held by angularly movable hooks actuated by a lever to be moved by the carriage. The hooks are retracted by disengaging the lever from a latch. Concurrently, the carriage is returned to the initial waiting position to eject the IC card out of the casing.

10 Claims, 14 Drawing Figures

DEVICE FOR INSERTING AND HOLDING AN IC CARD AS AN EXTERNAL MEMORY DURING READING AND WRITING OPERATIONS

BACKGROUND OF THE INVENTION

The present invention relates to a device for reading stored informations out of and writing new informations into an IC card as external memory.

The so-called IC card, which has a plurality of contact points exposed to be flush with the surface of one side thereof and electrically connected with a memory and a central processing unit respectively embedded therein, has far more memory capacity in comparison with a magnetic card so that it is going to be widely used as an identification card, credit card etc. in place of the conventional magnetic card.

The inventors have proposed a device having a pocket for an IC card to be angularly movable, as in a cassette tape recorder in U.S. Pat. No. 4,602,351, issued July 22, 1986, and European Pat. application No. 84304337.3, filed on June 26, 1984, and published Jan. 15, 1985, Pub. No. 0131410(A2). When the pocket loaded with the card is angularly moved to the closed position, the contact points of the card may be engaged with the contact pins planted in a block member which is mounted on the casing via spring means so as to be yieldingly movable.

This device must be mounted or placed, however, on the upper wall of the computer casing due to angular movement of the pocket, which may be disadvantageous from the view point of compactness.

The device having a stationary pocket in which the card is horizontally inserted has been actually used. Such a device is not satisfactory, however, in that the card is sometimes slipped out of the pocket and the tail or trailing end of the card protruded out of the casing end wall may accidentally touch something which may jeopardize electric connection of the card contact points with the contact pins in the device. When the external force affected on the card is strong, the card itself or the contact pins may be damaged. Furthermore, since the user of the IC card is often not familiar with computer operation, the card may be taken out of the device prematurely before or during the read/write operation by the computer.

SUMMARY OF THE INVENTION

It is an object of the invention, thus, to provide a device for reading and writing an IC card as external memory, in which the card is horizontally inserted and held therein while partly exposing the trailing end portion thereof so as to visually confirm the loaded card but without fear that the end portion touches anything for holding reliable electric connection of the card contact point with the contact pins in the device and consequently with the computer.

Another object is to provide such a device having locking means for the IC card to be firmly held during the read/write operation and adapted to be disengaged from the card to be ejected out of the device when the read/write operation is over.

Other objects and advantageous effects of the invention will be readily appreciated by reading the detailed explanation to be given hereinafter with respect to embodiments illustrated in the accompanying drawings.

DETAILED DESCRIPTION OF THE PREFERRED EMBODIMENTS

Figure 1:
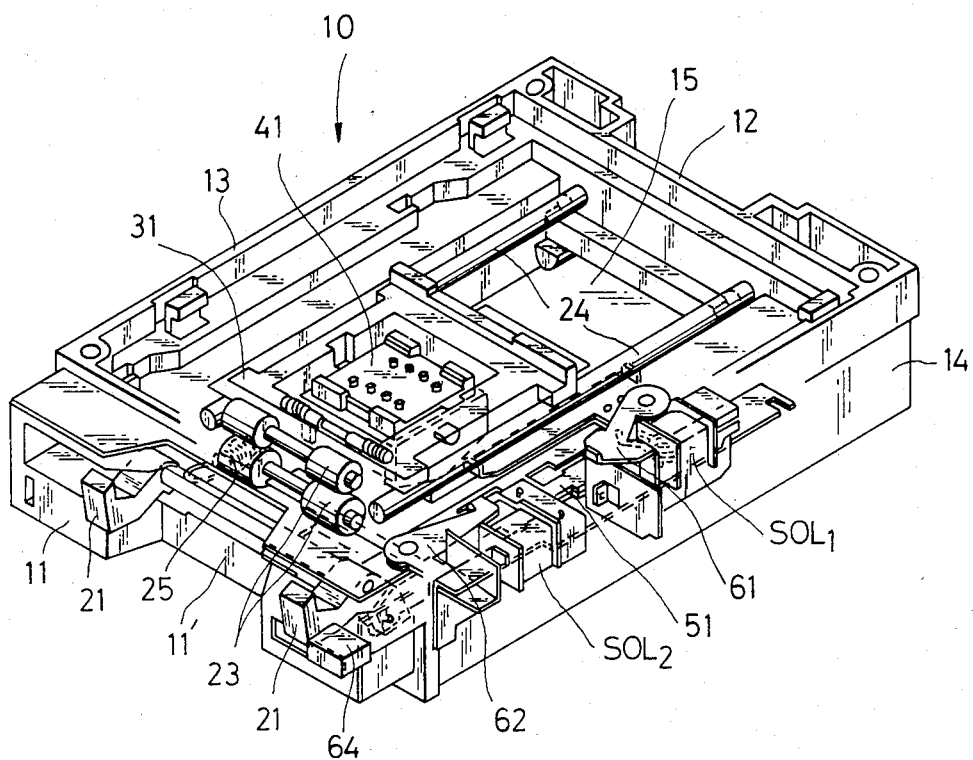
FIG. 1 is a perspective view of a first embodiment of the device according to the invention in which a lid is removed.
Figure 2A:
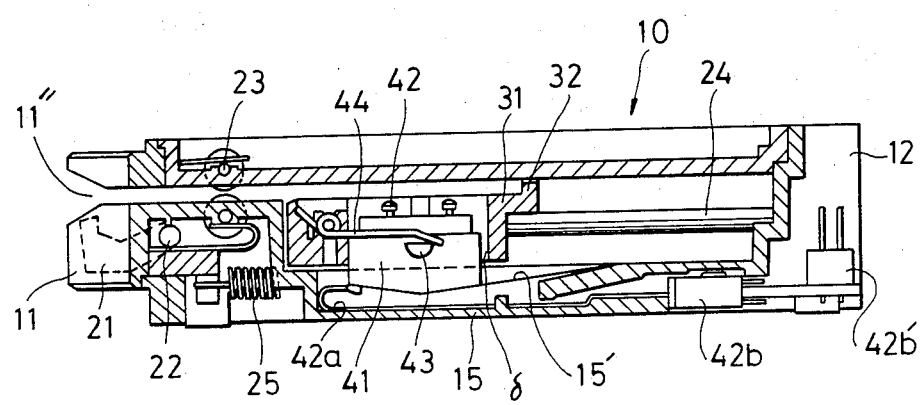
FIG. 2A is a side elevation of the FIG. 1 device partly in section.
Figure 2B:
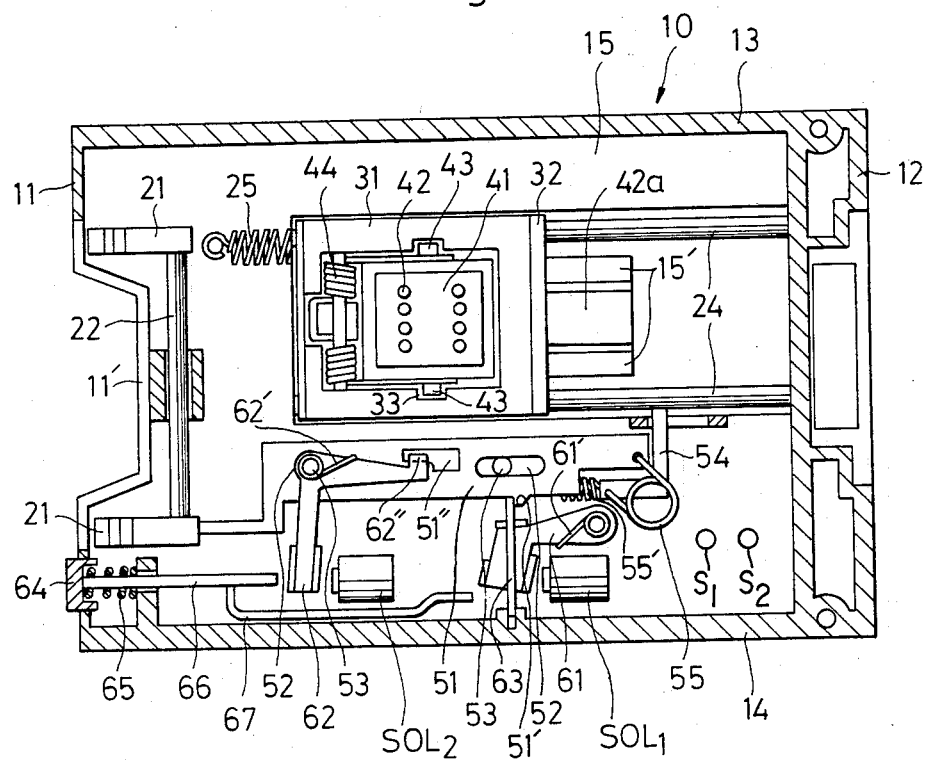
FIG. 2B is a plan view of the FIG. 1 device partly in section.
Figure 3A:
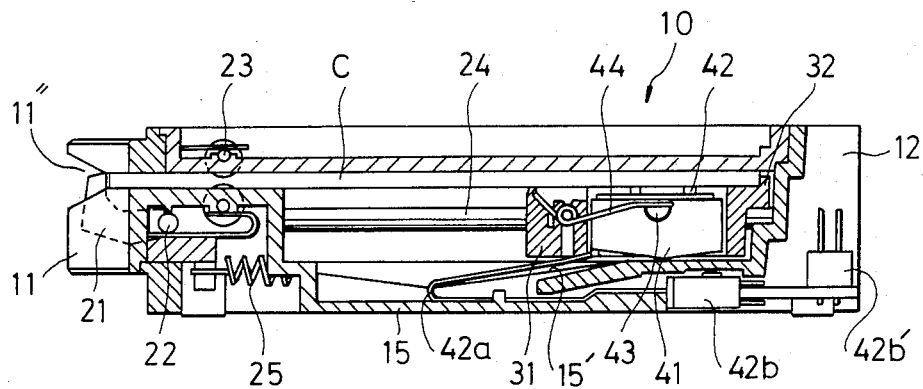
FIGS. 3A and 3B are views respectively similar to FIGS. 2A and 2B but movable members are in operative positions.
Figure 3B:
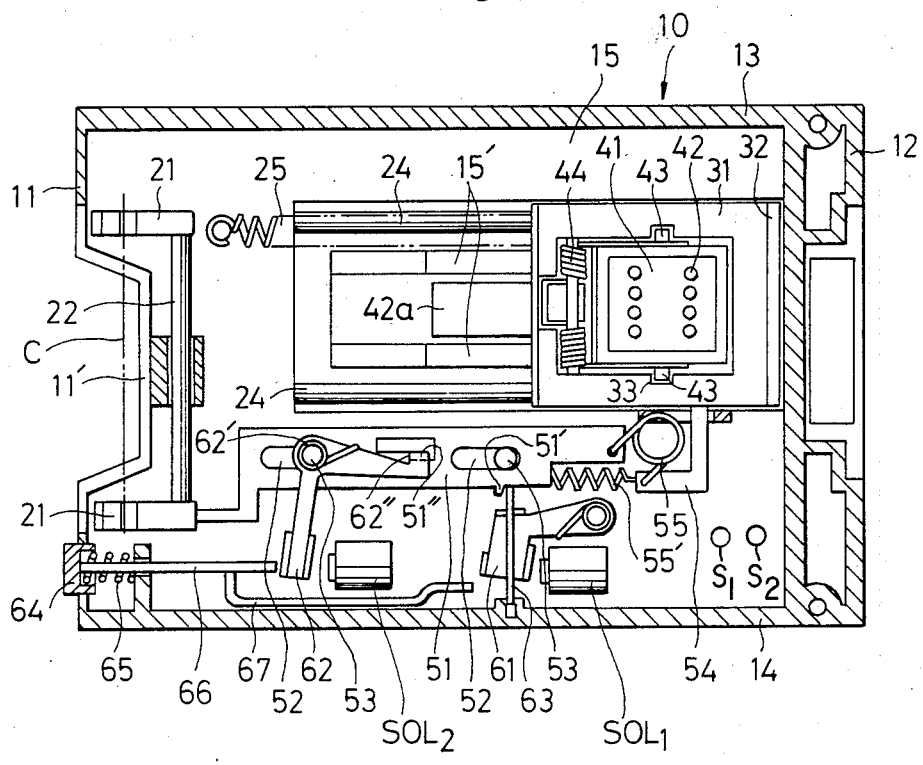

In FIGS. 1, 2A, 2B, 3A and 3B, a casing, denoted generally as 10, of the device according to a first embodiment consists of a front end wall 11, a back end wall 12, side walls 13, 14, a bottom wall 15 and a lid which is not shown. The front end wall 11 is recessed in a center part 11' so that a trailing end portion of an IC card C may partly be exposed there and formed with an inlet slit 11'' for the card C. As best shown in FIG. 2A by phantom lines, there are provided in the casing 10 at the vicinity of end wall 11 a pair of locking hooks 21, 21 connected with a transverse rod 22 so as to be angularly movable together between a retracted position as shown in FIGS. 2A, 2B and a locking position as shown in FIGS. 3A, 3B, where the IC card C is firmly held at the trailing edge by the respective free ends thereof so that the card C cannot be taken out or slip out of the casing. At the vicinity of inlet slit 11'' there are provided a pair of rolls 23 for guiding the card to be smoothly inserted in the casing.

A pair of bars 24, 24 are longitudinally mounted in the casing 10 for guiding a carriage 31 to be longitudinally movable, which is normally held in a waiting position as shown in FIGS. 1, 2A and 2B by means of a coiled spring 25. Carriage 31 is in the form of a rectangular frame having no top wall or bottom wall so as to embrace a block member 41 snugly therein and above all to leave a gap δ (FIG. 2A) therebetween, at the right in the drawing for a purpose to be explained later. Block 41 has a plurality of contact pins 42 (eight pins in the embodiment) mounted on its top to be engaged with contact points correspondingly arranged on the card C. Each of contact pins 42 is preferably fitted in a vertical groove formed in the block member 41 and provided with a coiled spring not shown at the root thereof so as to make good electrical engagement with the corresponding contact point of the card. The contact pins 42 are electrically connected with a computer (not shown)

through a flat sleeve involving lead wires 42a and connectors 42b and 42b'. Carriage 31 is provided with an upwardly protruded flange 32 at the leading end wall thereof so that when the card C is manually inserted from the inlet slit 11" in the casing the leading edge thereof may abut on flange 32 to move carriage 31 against the force of spring 25 towards the operating position (as shown in FIGS. 3A, 3B) along guide bars 24, 24.

In order that the block member 41 may be stably vertically moved relative to the carriage 31, block member 41 is provided with a pair of trunnions 43 respectively on the side walls to be fitted in a pair of vertical grooves 33 formed in the inner walls of the opposite side frame members. For the same purpose, there is provided coiled springs 44, 44 respectively fixed at one end thereof on the carriage 31 so that the other end of each of springs 44, 44 engages with the concerned trunnion 43 to resiliently urge the block member 41 downwards on the floor 15' of the bottom wall 15. There are provided a pair of rails 15', 15' sloped upwardly towards the back wall 12 (the right side in FIGS. 2A, 2B, 3A and 3B) on the bottom wall 15 so that the block member 41 brought together with the carriage 31 to the operating position may slide over the sloped floor 15' to be moved up against the force of the springs 44 relative to the carriage 31 to be in the position as shown in FIGS. 3A, 3B where the contact pins 42 may respectively engage the card contact points.

There is provided in the casing 10 further a longitudinally extended lever 51 in parallel to the guide bars 24 and consequently the carriage movement direction. Lever 51 is formed with two slots 52, 52 to engage respectively with two headed pins 53, 53 fixed on the bottom wall 15 so as to be longitudinally movable between the positions shown in FIG. 2B and FIG. 3B and has one end connected with the hooks 21, 21 in such a way that when the lever 51 is moved from the position of FIG. 2B where hooks 21, 21 are in the retracted position to the position of FIG. 3B, the hooks 21, 21 may be angularly moved to be in the locking position as shown in FIGS. 3A, 3B.

Figure 4A:
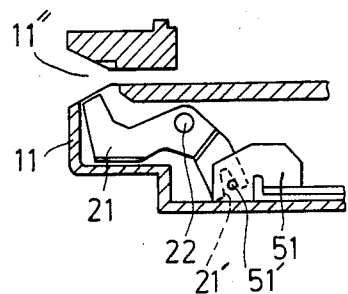
FIGS. 4A and 4B are side elevations partly in section of the front end portion of the device showing a hook respectively in the retracted position and the locking position.
Figure 4B:
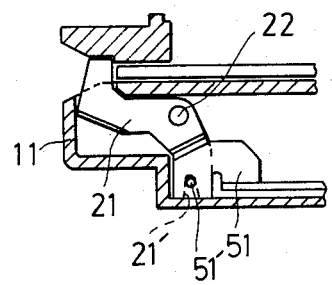

As best shown in FIGS. 4A, 4B, one end of the longitudinal lever 51 has a pin 51' which is engaged with a slit 21' formed at the root of hook 21. Thus, when lever 51 is longitudinally moved from the position shown in FIG. 4A to the right in the drawings to occupy the position shown in FIG. 4B, the hook is angularly moved around the bar 22 to be in the locking position.

There is provided in the casing further an L-shaped slider lever 54 so as to be longitudinally moved from the position shown in FIG. 2B to the position shown in FIG. 3B when the carriage 31 is moved from the waiting position to the operating position by abutment of a protrusion (not shown) formed on the carriage on one end of the L-shaped lever 54. This slider lever 54 is normally held in the position of FIG. 2B by a coiled spring 55'. There is provided a ring spring 55 having opposite legs, one being engaged with L-shaped lever 54 at the other end thereof while the other leg is engaged with the free end of longitudinal lever 51.

Although ring spring 55 serves to pull levers 51 and 54 together in the position shown in FIG. 2B, when the L-shaped slider lever 54 is forcedly moved by the carriage 31 so that the point where the one leg of the ring spring 55 engages with the L-shaped lever has passed the point where the other leg of the spring engages with the longitudinal lever 51 a little, the ring spring 55 is snappingly turned by an angle of about 90° to take the position as shown in FIG. 3B, where spring 55 serves to push the two levers apart from each other at this time.

Owing to this function of the ring spring 55 connected with the two levers, when the carriage 31 is moved to be in the operating position by manually inserting the card C, longitudinal lever 51 is snappingly moved from the position shown in FIG. 2B rightwards to be in the position of FIG. 3B so as to angularly move the hooks 21, 21 to firmly hold the card C at the trailing edge.

Figure 2C:
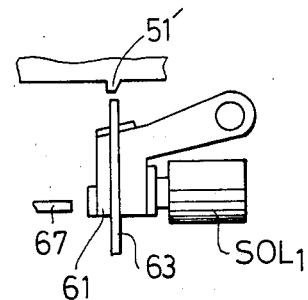
FIG. 2C is a schematic view showing a first armature lever angularly moved by energization of a solenoid as well as related members, respectively in a larger scale.

There are arranged two solenoids $SOL_1$, $SOL_2$ and respectively related armature levers 61, 62 at the vicinity of the longitudinal lever 51 in such a way that when solenoid $SOL_1$ is energized (FIG. 2C) the related armature lever 61 is angularly moved against the force of a spring 61' to clear a latch 63 fixed thereto from a protrusion 51' of the longitudinal lever 51 so as to be made movable from the FIG. 2B position to the FIG. 3B position and that when solenoid $SOL_2$ is energized the related armature lever 62 is angularly moved against the force of a spring 62' to disengage the other end 62" thereof from a recess 51" formed in the longitudinal lever 51 so as to be made movable from the FIG. 3B position to the FIG. 2B position.

Figure 5:
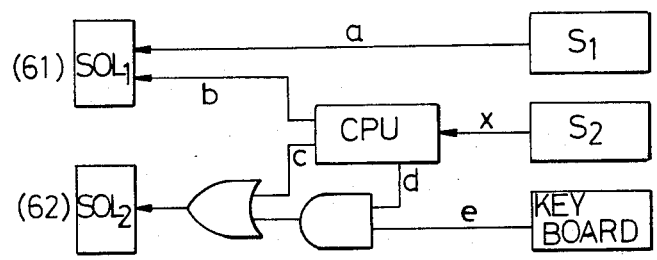
FIG. 5 is a block diagram showing how solenoid means is energized for actuating the longitudinal lever for moving the hook of FIGS. 4A and 4B, FIGS. 6A and 6B are views respectively similar to FIGS. 2A and 2B but of a second embodiment.

Solenoid $SOL_1$ is adapted to be momentarily energized when a sensor $S_1$ comprising a light emitter and detector detects the position of the card C just before the completely inserted position in reply to a signal a as shown in FIG. 5. Solenoid $SOL_2$ is adapted to be energized, as shown in FIG. 5, in reply to a command signal c from the CPU, for instance, when the device is installed as a cash dispenser in a bank, or in reply to combined command signals d from the CPU and e from the key board, for instance, when the device is mounted on a personal or office computer.

A push button 64 is provided at the front end wall 11 normally held in the position as shown in FIG. 2B by a spring 65. Button 64 has a rod 66 fixed thereto at one end so that the other end is located at the vicinity of second armature lever 62 so that when manually pushing the button 64 against the force of the spring 65 the free end of rod 66 may angularly move armature lever 62 to disengage the other end 62" thereof from the recess 51" in the longitudinal lever 51 without energization of solenoid $SOL_2$, which is necessary, for instance, when the card has been inserted in error, or when there is an electric power failure, so that the computer cannot be operated, or the solenoids cannot be energized, or the like. Rod 66 has a branched rod 67 having a free end located at the vicinity of the armature lever 61 so that when the solenoid $SOL_1$ is energized (FIG. 2C) to angularly move armature lever 61 (FIG. 3B), the push button cannot be actuated due to the free end of branched rod 67 abutting on armature 61, which is necessary for avoiding a premature taking out of the card before or during a read/write operation.

In operation, the IC card C is inserted from the inlet slit 11" so that the leading edge thereof abuts on the upwardly protruded flange 32 of the carriage 31 and moves the carriage toward the right in FIGS. 2A and 2B against the force of the spring 25 so that the block member 41 is raised up relative to the carriage 31 by sliding on the sloped floor or rails 15', 15' as referred to above. This movement of the carriage moves the L-shaped lever 54 towards the right in the drawings so that the ring spring 55 is turned by about 90° to cause a force on the longitudinal lever 51 to be moved leftwards in the drawings. Since the latch 63 fixed on the first armature lever 61 is still engaged with the protrusion 51' of the longitudinal lever 51 at the moment, however, lever 51 cannot be moved.

When the further moved card C is detected by the sensor $S_1$, the first solenoid $SOL_1$ is momentarily energized to disengage latch 63 from the protrusion 51' so that the longitudinal lever 51 is snappingly moved by the force of ring spring 55 to be in the position of FIG. 3B so as to angularly move the hooks 21, 21 to lock the card C now completely inserted at the trailing edge. The free end 62" of the second armature lever 62 is engaged with the recess 51" formed in longitudinal lever 51 so as to keep lever 51 and consequently hooks 21, 21 in the position as shown in FIG. 3A.

When fingers of the card user are removed from the trailing edge of the card completely inserted, the carriage 31 and the card C are retracted together owing to the force of the spring 25 by a distance corresponding to the space δ (FIG. 2A) left between the card trailing edge and the hooks, but the block member 41 is not retracted due to the force of the springs 44, 44 pressing block member 41 downwards so that there is caused a relative movement between the block member and the card and consequently between the contact pins of the former and the contact points of the latter which cleans the contact members for good electrical connection.

When the card C is completely inserted, this is detected by a second sensor $S_2$ and a corresponding signal x (FIG. 5) is sent to the computer to commence a read/write operation, during which the solenoid $SOL_1$ is adapted to be energized in reply to a signal b (FIG. 5) to attract the armature of the lever 61 so that the button 64 cannot be pushed.

When the read/write operation is finished, the second solenoid $SOL_2$ is adapted to be energized in reply to a signal c or combined signals d and e from the computer so as to disengage the free end 62" of the armature lever 62 from the recess 51" formed in the longitudinal lever 51 so that levers 51 and 54 may be snappingly moved from the FIG. 3B position to the FIG. 2B position to retract the hooks 21, 21 owing to the springs 55 and 55'. At the same time, the spring 25 snappingly pulls the carriage 31 to the initial position whereby the card C leading edge which abuts on the carriage flange 32 is ejected out of the casing.

A second embodiment will now be explained with reference to FIGS. 6A, 6B, 7A, 7B and 8. Construction or arrangement and operation of the carriage, the block member, the longitudinally elongated lever and the hooks are fundamentally similar to those of the first embodiment so that explanation thereof shall be omitted because there is no essential difference. The same referential figures are given to the same members.

Figure 6A:
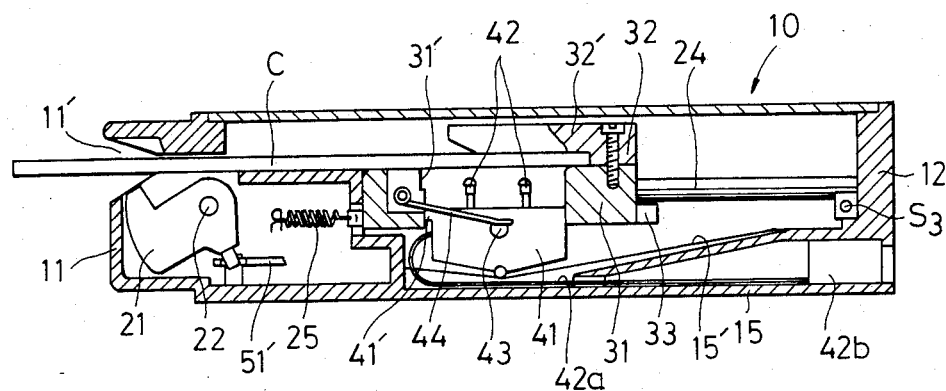
Figure 7A:
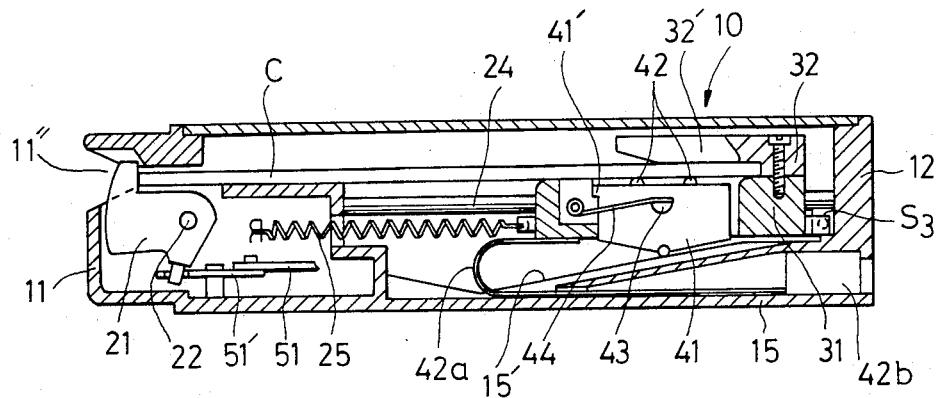
FIGS. 7A and 7B are views respectively similar to FIGS. 3A and 3B but of the second embodiment.

As best shown in FIGS. 6A and 7A, the block member 41 has a protrusion 41' on the front (left in the drawing) wall and the carriage 31 has a corresponding recess 31' in the concerned wall so that when block member 41 is raised up when the carriage 31 is brought in the operating position, protrusion 41' is engaged with recess 31' to cause relative movement between the two members and consequently between the contact pins of the block member and the contact points of the card which is firmly kept on the carriage for self cleaning and good electrical connection. It is added that the upward protrusion 32 of the carriage 31 has a horizontally extended flange 32' so as to form a pocket for holding the leading end portion of the card C in this embodiment different from the first embodiment where the card is guided by the upper wall of the casing which causes friction more or less between the card and the upper wall.

Figure 6B:
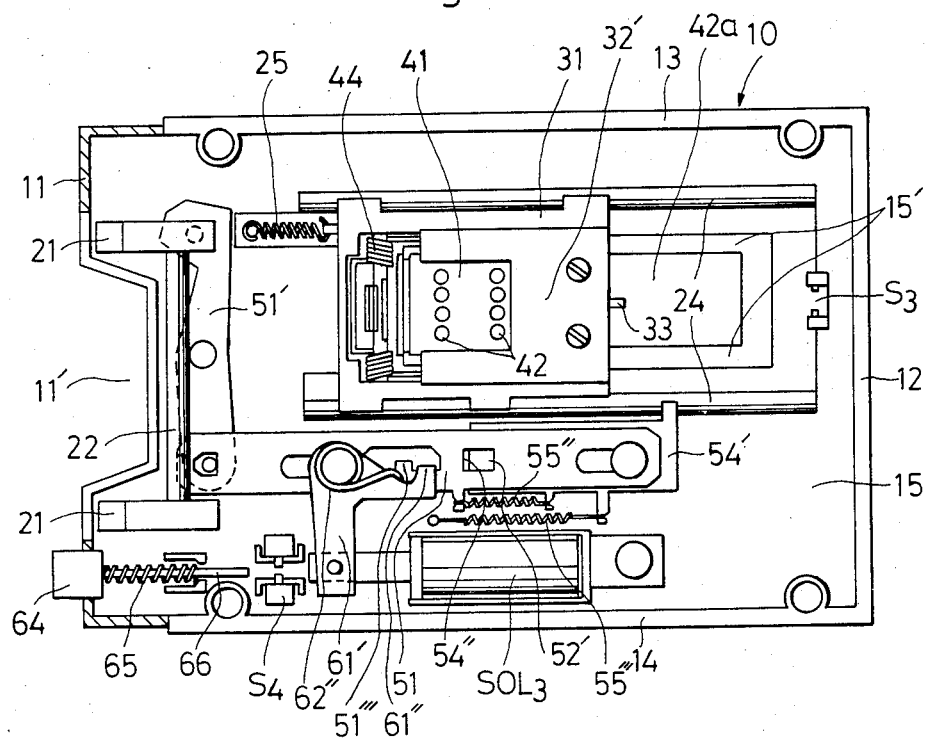
Figure 7B:
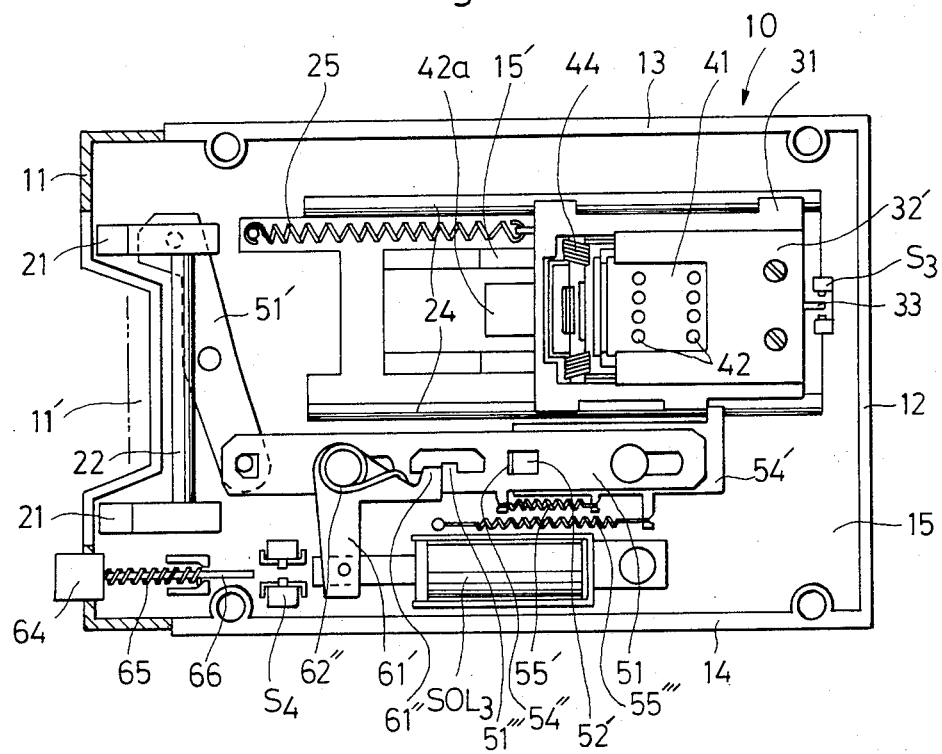

As best shown in FIGS. 6B and 7B, the longitudinally elongated lever 51 is not directly engaged with the hook 21 as in the first embodiment but has a link lever 51' in this embodiment therebetween having one end pivotedly connected with the related end of elongated lever 51 and another end pivotedly connected with one of the hooks 21. There is no difference, however, in the operation. When when elongated lever 51 is in the normal position as shown in FIG. 6B hooks 21, 21 are in the retracted position, while when lever 51 is moved by the carriage 31 to be in the second position as shown in FIG. 7B hooks 21, 21 are brought into the locking position.

In this embodiment, there is provided only one pair of a solenoid $SOL_3$ and a latch lever 61' having an armature at one end thereof to be attracted by the solenoid when energized. In the normal state as shown in FIG. 6B, the other end 61" of latch lever 61' is engaged with the elongated lever 51 at one side (right side in said drawings) of the protrusion 51'" formed therein so as to prevent lever 51 from moving towards the position in FIG. 7B and consequently so as to keep the hooks 21, 21 in the retracted position.

The slider lever 54' is connected with elongated lever 51 not by the particular ring spring 55 as in the first embodiment but by a usual coiled spring 55". Owing to another coiled spring 55'" fixed to the casing at one end and to slider lever 54' at the other end, both levers are held together in the first position as shown in FIG. 6B. There is provided a protrusion 54" on the slider lever 54' so as to engage with an opening 52' formed in the lever 51 for a purpose to be referred to hereinafter.

When the card C is inserted from the inlet slit 11' into the casing and consequently the carriage 31 is moved towards the operating position in FIG. 7B, the slider lever 54' is forcedly moved by carriage 31 against the force of springs 55", 55'", but the elongated lever 51 is held still in the position of FIG. 6B since it is engaged with the latch lever 61'.

When the card C is completely inserted in the casing and consequently the carriage 31 arrives at the operating position, a projection 33 mounted at the leading end wall of the carriage is detected by a sensor $S_3$ mounted at the back end wall 12 of the casing so as to energize the solenoid $SOL_3$ for a moment to actuate the latch lever 61' against the force of a spring 62" to clear said protrusion 51'" and allow the elongated lever to snappingly move owing to spring 55" towards the second position, whereby the hooks 21, 21 are snappingly brought into the locking position.

Latch lever 61' now engages at the end 61" with protrusion 51'" at the other side (left side in the drawings) so as to prevent the elongated lever 51 from moving back to the initial position and consequently so as to keep the hooks 21, 21 in the locking position.

Figure 8:
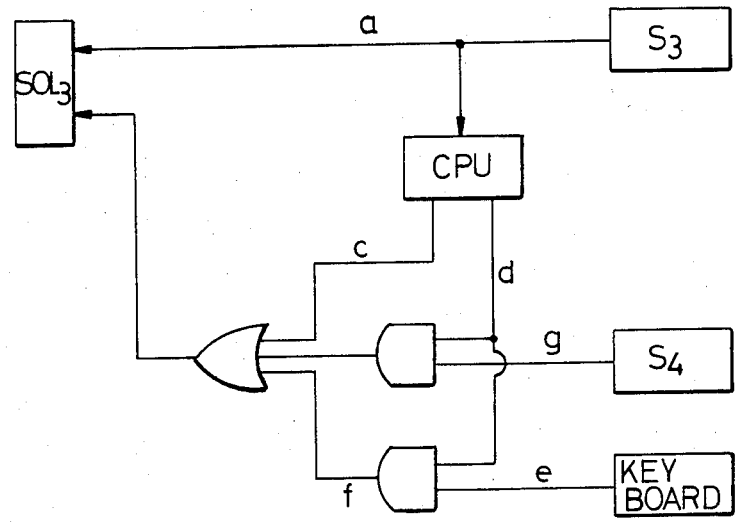
FIG. 8 is a block diagram similar to FIG. 5 but of the second embodiment.

When the read/write operation is finished, solenoid $SOL_3$ is adapted to be energized again in reply to a signal c or combined signals d and e from the computer as shown in FIG. 8 so that the other end 61" of the latch lever 61' is disengaged from the protrusion 51'" of the elongated lever 51 to be made movable, whereby the lever 54' and the lever 51 engaged therewith by means of protrusion 54" and opening 52' are returned to the initial position owing to springs 55'", whereby the hooks 21, 21 are snappingly brought into the retracted position and concurrently the carriage 31 is snappingly pulled to be in the initial position for ejecting the card C out of the casing by means of spring 25. When the solenoid SOL₃ is deenergized, the end 61" of the armature lever 61' is engaged with the protrusion 51'" again at the right side in FIG. 6B.

When it is necessary to manually take the card out of the casing, the button 64 is pushed against the force of the spring 65 as in the preceding embodiment. In this embodiment, however, when the free end of the rod 66 fixed to button 64 is detected by a sensor S₄, the solenoid SOL₃ is adapted to be energized in reply to the combination of a signal g from sensor S₄ and signal c from the computer not in read/write operation so as to disengage the latch lever 61' from the protrusion 51'" of the elongated lever 51 to be returned to the first position so that the hooks 21, 21 are brought into the retracted position and at the same time the carriage 31 is returned to the initial position for ejecting the card C out of the casing as referred to above. When the solenoid SOL₃ cannot be energized for any reason, e.g. power failure, the button 64 is further pushed on for instance by a pencil. The free end of the rod 63 may mechanically actuate the latch lever 61' so as to realize the series of movements just referred to above.

The terms, "horizontally", "vertically" and the like have been used on the premise that the device according to the invention is mounted on the computer and the like in the illustrated position. The device, however, may be mounted in a plane normal to the horizontal plane or at any angle thereto as occasion demands, since the various movements have no connection with gravity. These terms should thus be correspondingly understood in compliance with the device position.

What is claimed is:

1. Reader and/or writer for an IC card having a plurality of exposed contact points flush with the surface of one side of said IC card, comprising:
    a casing having one end wall and another opposite end wall, said one end wall having an inlet slit for inserting said IC card, said casing having a sloped floor ascending from a lower portion to an upper portion thereof towards said opposite end wall of the casing,
    a block member having a corresponding number of contact pins adapted to be electrically connected with the contact points of said IC card;
    pin spring means on said block member urging said pins to protrude out of the block member;
    a card carriage arranged in the casing;
    first spring means urging said carriage towards said inlet slit, whereby said carriage is longitudinally movable in one direction by force applied through inserting said IC card in said inlet slit and movable in a counter direction by the first spring means when said IC card is withdrawn from said inlet slit;
    wherein said block member is snugly embraced in the carriage for movement along the sloped floor of said casing between a waiting position in which the block member is situated in the lower portion of the sloped floor and an operating position in which the block member is situated in the upper portion of the sloped floor and the contact pins of the block member are electrically connected with the contact points of said IC card fully-inserted in the casing; and
    locking means adapted to be actuated when said IC card is fully inserted in said casing for maintaining the electrical connection between the contact pins of the block member and the contact points of the fully-inserted IC card during an operation of reading and/or writing.

2. Reader and/or writer as claimed in claim 1, wherein the block member includes a wall opposing said one end wall of said casing and a protrusion extending outwardly from said wall opposing said one end wall of said casing, and the card carriage includes a corresponding recess in one end wall opposing said wall of said block member, said protrusion engaging said recess when the block member is moved into the operating position to provide slight relative movement between the block member and the card carriage, whereby there results rubbing between the contact points of the IC card moving with the card carriage and the contact points of the block member to insure good electrical connection therebetween.

3. Reader and/or writer as claimed in claim 1, wherein the card carriage includes an edge opposing the opposite end wall of the casing and a flange on said edge, said flange having a horizontal flange extending towards the one end wall of the casing, thereby forming a pocket for receiving a leading end portion of the IC card.

4. Reader and/or writer as claimed in claim 1, wherein the locking means comprises a pair of hooks arranged in the vicinity of the one end wall of the casing and adapted to be angularly moved together between a potential position where said hooks are retracted in the casing and a locking position where said hooks are exposed to engage a trailing edge of the IC card fully-inserted in the casing, and wherein said one end wall of the casing has a recess in a central part of the casing so that a trailing end of the IC card is partially exposed between opposite side portions of said recess where said hooks engage said card.

5. Reader and/or writer as claimed in claim 4 further comprising lever means; second spring means engaging said lever means; latching means engaging said lever means; wherein said lever means is adapted to engage said pair of hooks and is arranged to be longitudinally movable between a first position where said lever means is normally engaged by said second spring means and said latching means to keep said pair of hooks in the potential position and a second position to which said lever means is forcedly moved against the force of said second spring means by the card carriage moving towards the operating position; and an electromagnetic mechanism for momentarily clearing engagement of said lever with said latching means to actuate said hooks into said locking position, whereafter said hooks are kept in said locking position by engagement of said lever means with said latching means.

6. Reader and/or writer as claimed in claim 5, wherein said casing includes headed pins and said lever means comprises a longitudinally elongated lever engaging at least one of said pair of hooks, said elongated lever having slots therein of a prescribed length to respectively engage with said headed pins on said casing for movement in parallel to the carriage movement by a distance defined by the slot length, and further comprising a slider lever and third spring means connecting said slider lever with said elongated lever, whereby said elongated and slider levers are normally held together in said first position by said second and third spring means and, when said slider lever is forcedly moved against said second spring means by said card carriage moving towards said operating position, said elongated lever is held in the first position by engagement with said latching means and snappingly moved to said second position by said third spring means when said electromagnetic mechanism momentarily clears engagement of said elongated lever with said latching means.

7. Reader and/or writer as claimed in claim 6, wherein said latching means comprises an angularly movable two-arm lever having first and second ends, an armature provided at said first end of said two-arm lever, a first solenoid, and means for momentarily energizing said first solenoid when the IC card is fully-inserted in the casing and a reading and/or writing operation is completed for angularly moving said two-arm lever to disengage the second end thereof from the elongated lever for movement to either of said first and second positions.

8. Reader and/or writer as claimed in claim 7 further comprising a second latch lever and a second solenoid for actuating said second latch lever, wherein said first solenoid is adapted to be energized just as the IC card is fully-inserted in the casing and said second solenoid is adapted to be energized for actuating said second latch lever after a reading and/or writing operation is completed.

9. Reader and/or writer as claimed in claim 7 further comprising a button having a rod fixed thereto having a free end, a sensor, and sensor spring means holding said rod free end outside of said sensor, whereby when said button is manually pushed against the force of said sensor spring means, said rod free end is detected by said sensor to energize said first solenoid and render the elongated lever movable to the first position, and whereby when said button is pushed further, said rod free end mechanically actuates said two-arm lever as if the solenoid had attracted the armature of said two-arm lever.

10. Reader and/or writer as claimed in claim 8 further comprising a button having a rod fixed thereto having a free end and rod spring means holding said rod free end in the vicinity of said second latch lever, whereby when said button is manually pushed said rod free end mechanically actuates said second latch lever as if said second solenoid had been energized, said rod having a branched extension with a free end positioned just behind the first latch lever, whereby during a reading and/or writing operation, manual pushing of the button and manual actuation of said second latch lever are prevented by abutment of the free end of said branched extension on said second latch lever.

* * * * *